United States Patent [19]

Vetter

[11] 4,331,344
[45] May 25, 1982

[54] FAIRING MOUNTING APPARATUS

[75] Inventor: Craig W. Vetter, Rantoul, Ill.

[73] Assignee: First Champaign Corporation, Rantoul, Ill.

[21] Appl. No.: 867,189

[22] Filed: Jan. 3, 1978

Related U.S. Application Data

[63] Continuation-in-part of Ser. No. 723,920, Sep. 16, 1976, abandoned.

[51] Int. Cl.$^3$ ............................................. B62J 17/00
[52] U.S. Cl. ................................ 280/270; 280/289 S; 296/78.1
[58] Field of Search .................... 296/78.1, 1 S, 84 R, 296/95 R; 180/1 FV; 280/289 R, 289 G, 289 S, 270

[56] References Cited

U.S. PATENT DOCUMENTS 4,066,291  1/1978  Hickman .................... 296/78.1

Primary Examiner—John L. Love
Assistant Examiner—John A. Carroll
Attorney, Agent, or Firm—Wegner, Stellman, McCord, Wood & Dalton

[57] ABSTRACT

A disk on a motorcycle fork blocks the flow of air and water upwardly along the fork and is rotatable in a frame mounted carrier located inside a motorcycle fairing mounted on the motorcycle frame. The disc also functions as an engine noise barrier. A pair of crash bars, one on either side of the motorcycle, have forward ends secured to the fairing mounting plates above the front wheel. The crash bars extend downwardly and rearwardly and diverge outwardly from the motorcycle. The intermediate portions of the crash bars are secured to the motorcycle frame and the rear portions rest on the engine.

6 Claims, 9 Drawing Figures

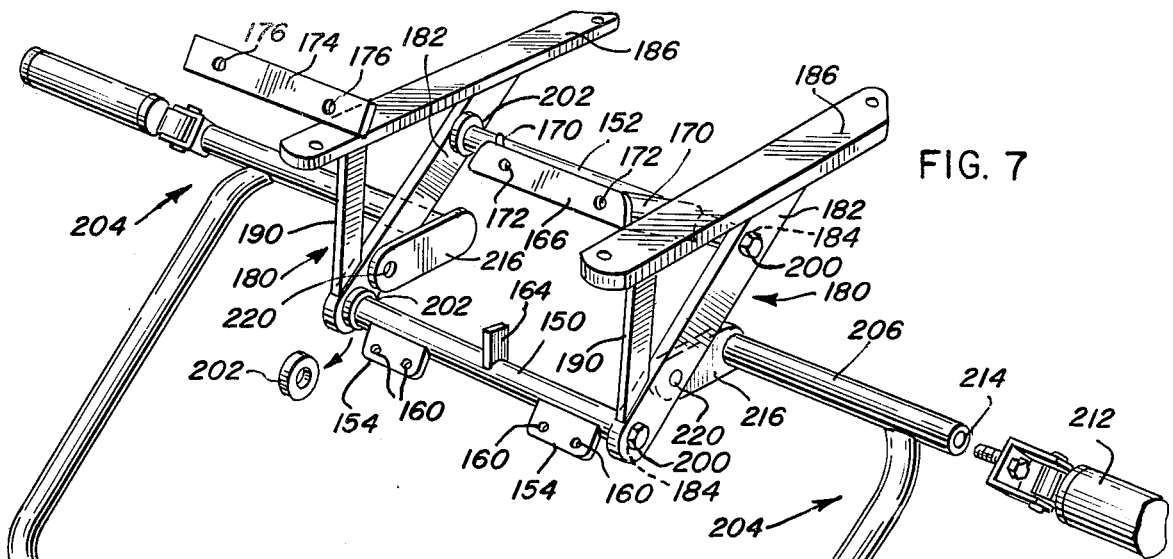
FIG. 7
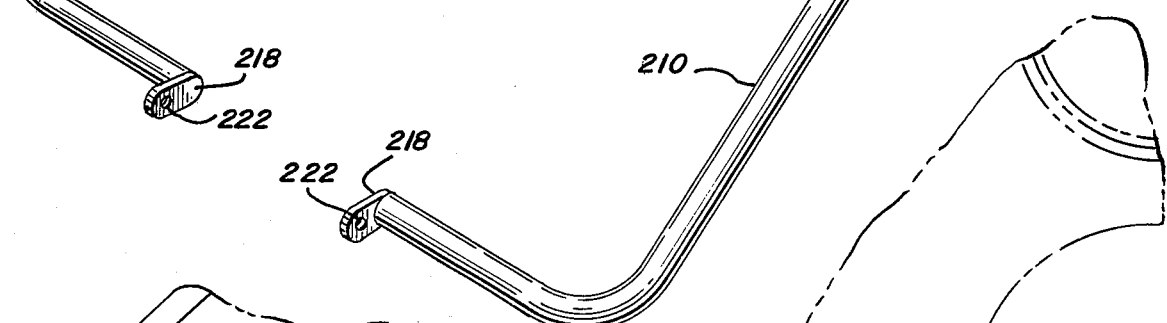
FIG. 8
FIG. 9
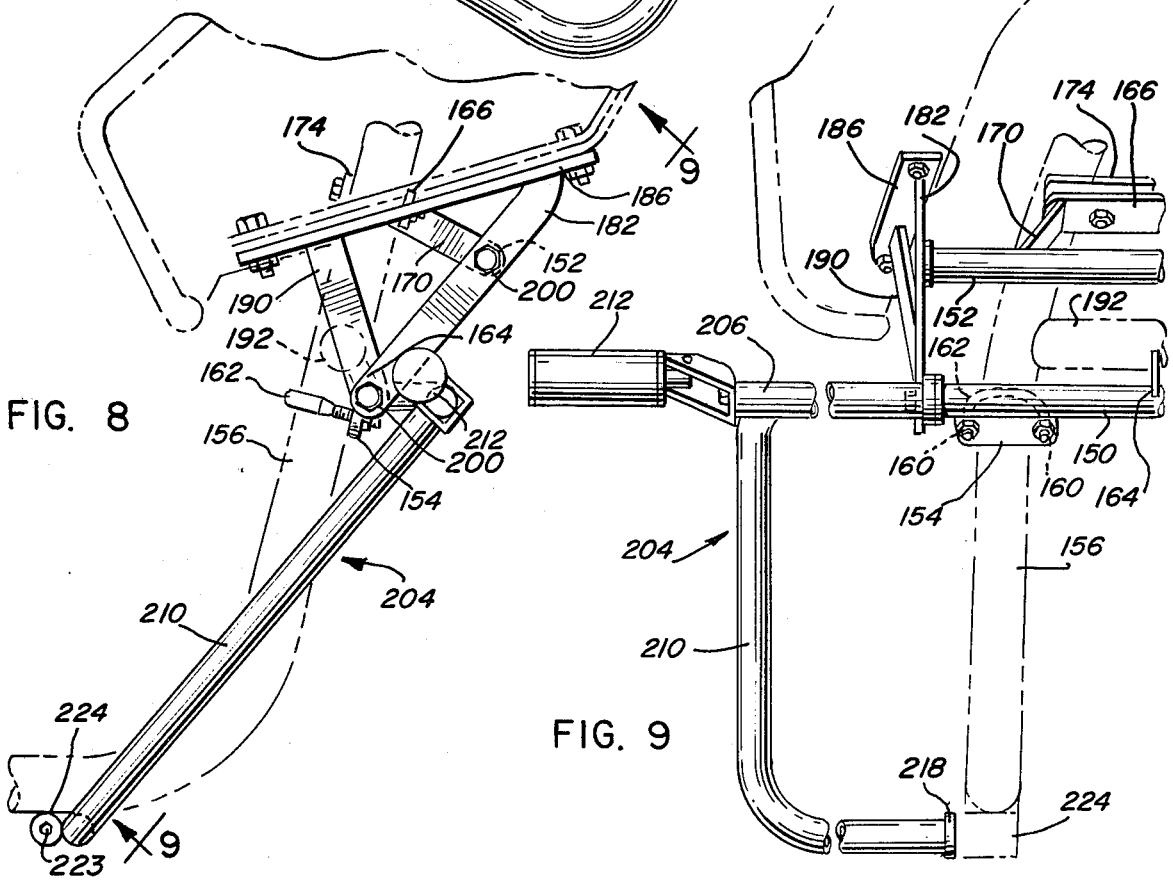

FAIRING MOUNTING APPARATUS

CROSS-REFERENCE TO RELATED APPLICATION

This application is a continuation-in-part of application Ser. No. 723,920 filed Sept. 16, 1976, and now abandoned.

This invention is concerned with a rotatable disc mounted on the fork of a motorcycle in combination with a fairing to block the flow of air and water upwardly along the fork.

SUMMARY OF THE INVENTION

A principal feature of the invention is the provision of a disc mounted on the front wheel fork of a motorcycle to act as a noise barrier and to block the flow of air and water upwardly along the fork with a disc carrier mounted on the frame and preferably forming a part of a fairing mount.

Another feature is the provision of a pair of crash bars, one on either side of the motorcycle, each having a forward end secured to a frame mounted fairing and extending rearwardly along the motorcycle, with means securing the rear portion of each bar of the motorcycle frame.

Further features and advantages of the invention will readily be apparent from the following specification and from the drawings.

BRIEF DESCRIPTION OF THE DRAWINGS

FIG. 7 is an exploded perspective of a preferred form of cross members and fairing mounting plate;

FIG. 8 is a side elevation of the cross members and fairing mounting plate of FIG. 7, in place on a motorcycle frame;

FIG. 9 is a fragmentary front elevation of the cross members and mounting plate of FIG. 8, taken along line 9—9 of FIG. 8;

Figure 1:
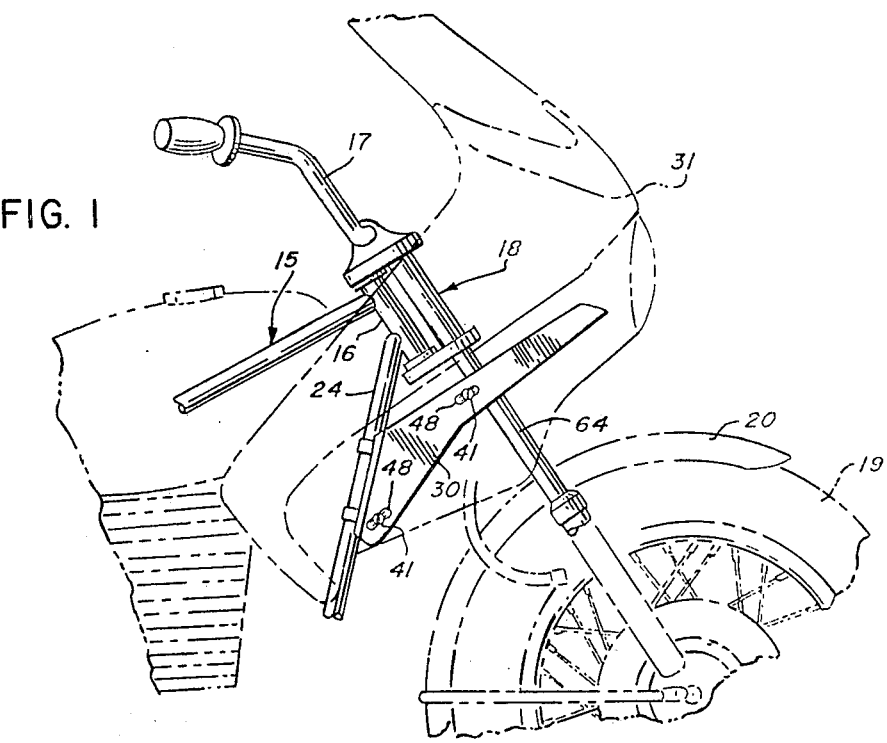
FIG. 1 is a fragmentary elevation of a motorcycle with the fairing mounting apparatus thereon and the fairing outline in broken lines.
Figure 2:
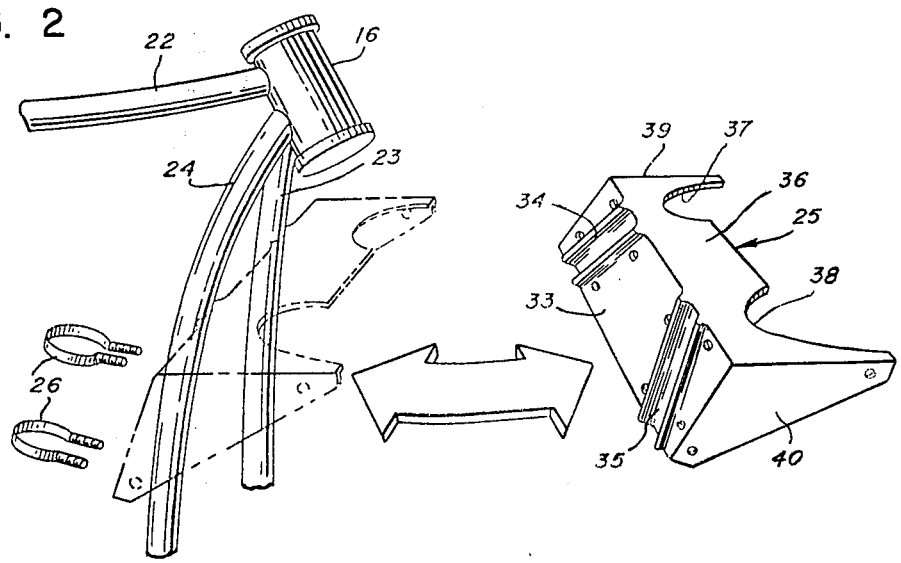
FIG. 2 is an exploded perspective of a portion of a motorcycle frame and the cross bar.
Figure 3:
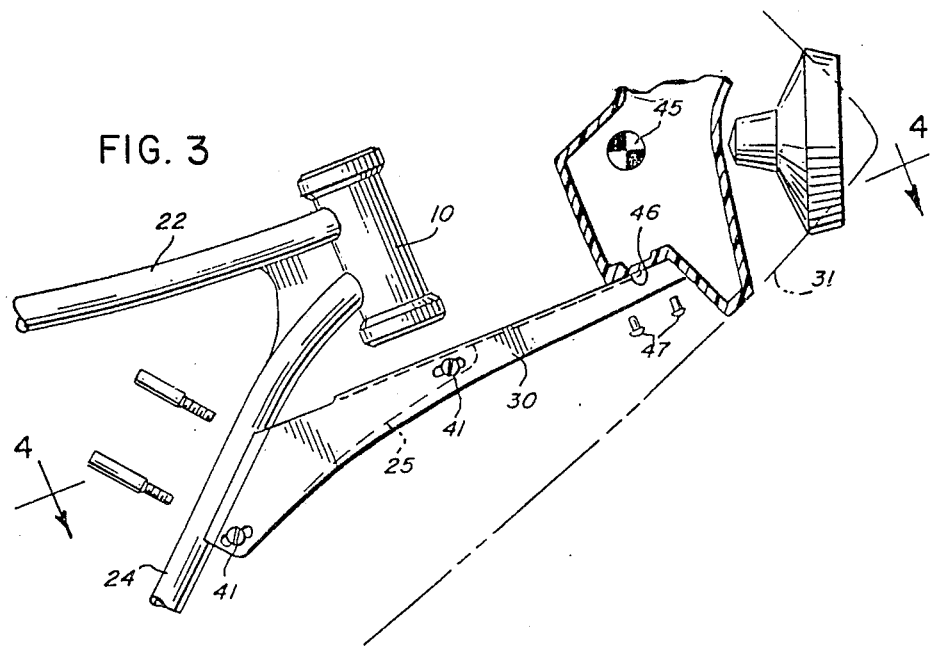
FIG. 3 is a side elevation of a portion of the frame with the cross bar thereon and a preferred form of a fairing mounting plate.

Considering first FIGS. 1, 2 and 3, the motorcycle frame 15 has a fork head 16 in which the handlebars 17 and front wheel fork 18 are mounted. The front wheel 19 and fender 20 are carried by the front wheel fork 18. The axis of the fork head 16 is inclined rearwardly from the vertical. An upper frame member 22 extends rearwardly from fork head 16 and a pair of tubular frame members 23, 24 extend rearwardly and downwardly from the fork head and diverge from each other, one on either side of the longitudinal center plane of the motorcycle. A transverse carrier in the form of a die cast fairing support cross bar 25 is secured to the frame tubes 23, 24, as by U-bolts 26. Fairing mounting plates 29, 30 are secured to the cross bar and extend forwardly therefrom under the center of gravity of fairing 31 and above front wheel 19.

Cross bar 25 has a rear wall 33 in which are formed elongated surfaces 34, 35 of arcuate cross section which mate with frame tubes 23, 24, respectively. Many makes and models of motorcycles have such two-tube construction but differ in specific geometry as in tube diameter and spacing, angle of the fork head, angle of the frame tubes from the fork head and angle of divergence of the tubes. A cross bar 25 designed for a specific motorcycle frame mates with that frame in only one position so that the cross bar is located in a desired relationship to the frame. Measuring and alignment of the cross bar are unnecessary. The cross bar cannot be incorrectly mounted.

Motorcycles which have only one down tube require a cross bar which is fitted to the down tube and to a suitable second point of the frame, as a surface of the engine, the fork head or the like. The specific cross bar configuration is determined by the motorcycle design. It would unnecessarily complicate the disclosure to illustrate the variety of motorcycle frames which are in use.

The upper surface 36 of the cross bar 25 is located in a plane generally at right angles to the axis of fork head 16. The surface is relieved at 37, 38 to accommodate the fork 18 when the front wheel is turned. The end faces 39, 40 of the cross bar are planar and generally parallel with the longitudinal plane of the motorcycle frame, one spaced on either side thereof. A length of 32 cm. is sufficient to fit the widest motorcycle frame presently in common use.

Fairing mounting plates 29, 30 are secured to the parallel end faces 39, 40 of cross bar 25, as by screws 41, and extend forwardly therefrom. The fairing mounting plates have inturned upper flanges 43, 44 providing fairing supporting surfaces, under the center of gravity 45 of the fairing, on which the mounting surfaces of the fairing, as the surface 46, FIG. 3, are received. Machine screws 47 may be used to secure the fairing to the supporting surfaces of the mounting plates.

The length of the fairing mounting plates 29, 30 and the location of the fairing supporting surfaces 43, 44 are selected for the fairing configuration and the location of the fairing mounting surfaces. Slots 48 in the end plates accommodate a limited longitudinal adjustment of the plates to center the fairing with respect to the fork head 16. The position of the cross bar 25 on the motorcycle frame is determined by the location of the tube mating surfaces 34, 35. If the cross bars for each of a plurality of motorcycle frames are properly dimensioned, the fairing supporting surfaces 43, 44 of the fairing mounting plates 29, 30 will be properly located to position the fairing 31 in the desired relationship to the motorcycle frame. Thus, one style of mounting plate may be used with the selected fairing on any of several motorcycle frames.

Figure 5:
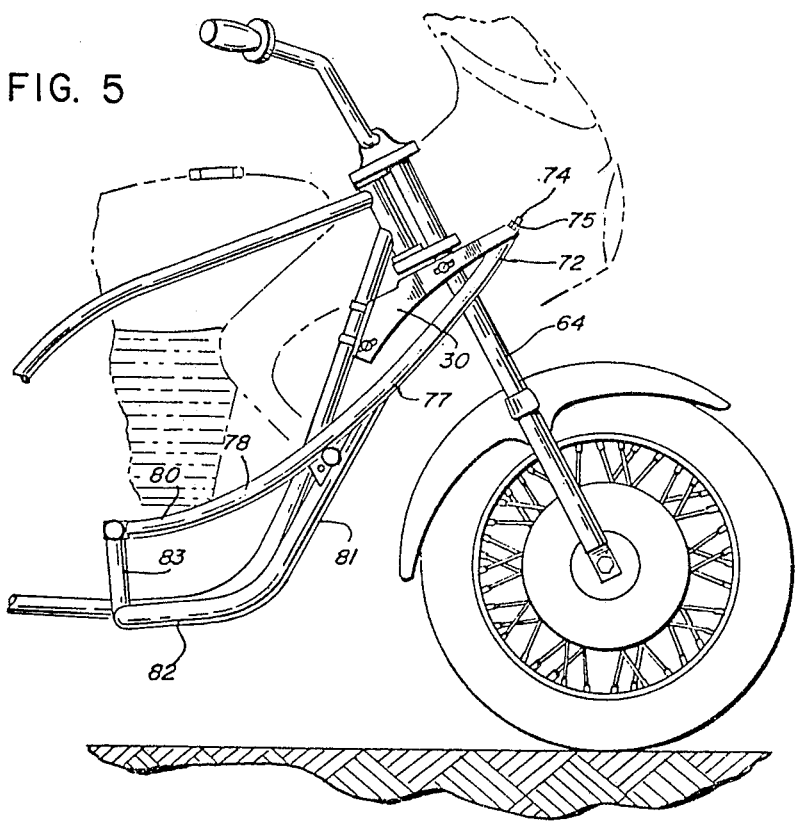
FIG. 5 is a side view of the motorcycle and fairing with crash bars.
Figure 6:
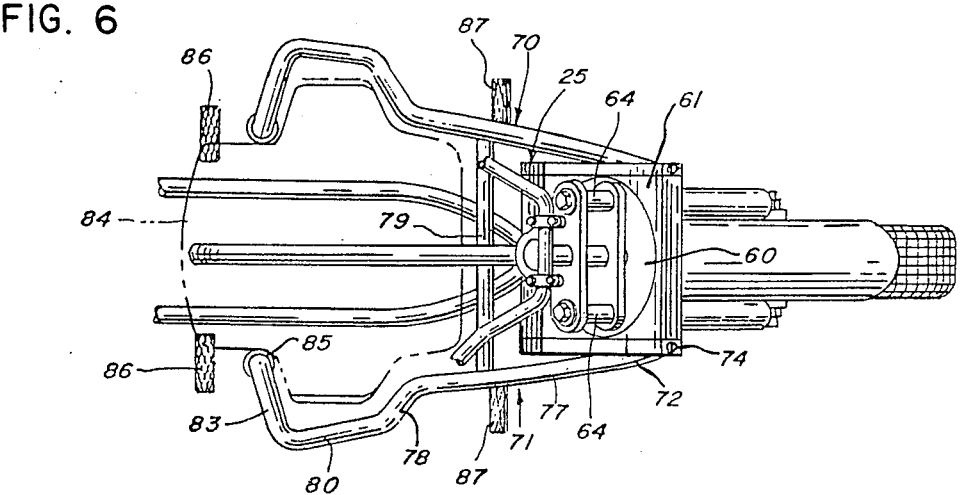
FIG. 6 is a plan view of the motorcycle and crash bars of FIG. 5.

Some fairings presently in general use have mounting surfaces located at the lower rear side portions thereof. FIGS. 5 and 6 illustrate an alternate form of fairing mounting plate 50, 51 used with this style of fairing. Mounting plates 50, 51 are secured to the planar end faces 39, 40 of cross bar 25 and extend downwardly and rearwardly from the cross bar. The lower edges 52, 53 of the fairing mounting plates extend laterally outwardly providing fairing supporting surfaces which extend longitudinally of the motorcycle frame. The fairing 54 has mounting surfaces, as 55, shown received on supporting surface 53 and secured thereto by screws 56.

Figure 4:
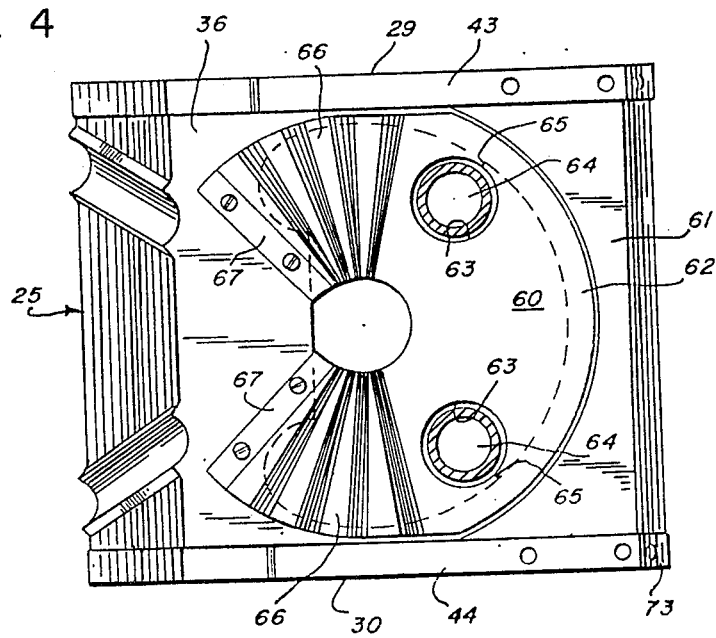
FIG. 4 is a plan view of the fairing mounting plate taken along line 4—4 of FIG. 3.

FIGS. 3 and 4 illustrate a further feature of the invention. A rotating disc 60 is mounted on the front wheel fork 18 to block the flow of air and water upwardly along the fork, and to reduce the engine noise heard by the motorcycle operator. A disc carrier plate 61 is connected between the fairing mounting plates 29,30 and has an annular channel 62 in which the periphery of disc 60 is received. Carrier plate 61 lies in a plane at right angles to the axis of fork head 16 and mates with the fairing, the motorcycle frame and the cross bar 25. Disc 60 closes the opening between the forward edge of cross bar 25 and the carrier plate 61. Disc 60 has spaced openings 63 which receive the legs 64 of the front wheel fork 18. Slits 65 extend from the openings 63 to the periphery of the disc so that the disc may be mounted on the front wheel fork legs without removing the front wheel. Disc 60 has a semicircular planar portion and a pair of pleated portions 66 one at each end of the planar portion, the pleated portions being connected with the upper surface 36 of the cross bar 25 as shown at 67.

Disc 60 is preferably of a flexible material that will not fracture at low temperatures. Polypropylene plastic is satisfactory. The pleated portions may be formed in the plastic or may be flexible sections formed separately, as of a fabric material.

Another feature of the fairing mount of FIGS. 1-4 is that it affords a connection point above the front wheel 19 for crash bars 70, 71, FIGS. 5 and 6. The fairing is not shown for clarity. The crash bars are essentially mirror images and only one will be described in detail. The forward end 72 of crash bar 71 is fastened to a fairing mounting plate 30 at 73 (see also FIG. 4). A threaded stud 74 extends from the crash bar through the disc carrier plate 61 and fairing mounting plate 30 and is secured by nuts 75. Crash bar 71 has first and second intermediate portions 77, 78 which extend downwardly and outwardly from the fairing mounting plate. A cross bar 79 secured to frame tubes 23, 24 is connected between the intermediate portions of the crash bars. Rear portion 80 of the crash bar extends rearwardly, generally parallel with the plane of the motorcycle frame and preferably at a height corresponding with automobile bumper height, protecting the rider's leg.

A lower crash bar member has a forward portion 81 extending downwardly from the rear part of bar portion 77 and then rearwardly at 82. The rear ends of upper and lower bar portions 80, 82 are joined by an inwardly extending U-shaped bar member 83 which rests against the engine indicated in broken lines at 84. A rubber sleeve 85 provides a cushion between the bar member 83 and the engine. Bar members 83 are preferably held firmly against engine 84, affording a rigid crash bar mount. In the event the engine profile is not symmetrical, bar members 83 may differ in configuration to match. Foot pegs 86 for the rider's feet extend outwardly from the frame at a point rearwardly of crash bar end portion 83 so that the crash bar is in front of the rider's leg. Auxiliary foot pegs 87 are mounted on gusset plates between the crash bar portions 78, 81 and afford a relaxing position for the rider's feet, as during highway cruising.

The diverging crash bars give the motorcycle a tapered or wedge-shaped configuration so that an impact with another object causes deflection that minimizes damage or injury. The motorcycle will, for example, glance off an automobile. Horizontal bar portion 80 is at automobile bumper height and will not catch a bumper as can occur with vertical loop-type crash bars which have been used. Lower crash bar 82 is adjacent the lower portion of the engine and protects the engine in the event of a skid.

FIGS. 7-9 illustrate further forms of fairing mounting apparatus wherein the transverse carrier comprises a pair of elongate cross members extending transversely of the motorcycle frame. One advantage of the use of dual elongate cross members, rather than the unitary cross bar of FIGS. 1-4, is the lower manufacturing costs of rods and tubes as compared to that of a typically cast molded unitary cross bar.

Referring to FIG. 7, a preferred form of fairing mounting hardware is illustrated. The hardware includes lower and upper cross members 150, 152, respectively. The cross members 150, 152 are of equal length and each has an axial bolt hole (not shown) in either end. The lower cross member 150 has two tangential mounting flanges 154 each alignable with a down tube 156 of a specific motorcycle frame. Each flange 154 has two spaced mounting holes 160 for receipt of a U-bolt 162 or other suitable fastening means. The lower cross member 150 further includes a locating tab 164 in the form of an upstanding plate fixed centrally of the cross member 150 and projecting at right angles therefrom.

The upper cross member 152 has a longitudinal mounting plate 166 spaced therefrom by dual support arms 170. The mounting plate 166 has dual mounting holes 172 spaced so as to accommodate the frame down tubes 156, as described below. A backing plate 174 with mounting holes 176 alignable with those of the mounting plate 166 cooperates with the mounting plate 166 to secure the upper cross member 152 to the motorcycle down tubes 156.

A fairing mounting bracket, generally designated 180, comprises a longitudinal side plate 182 with mounting holes 182 alignable with bolt holes of the lower and upper cross members 150, 152, and a fairing support plate 186 angularly fixed to the side plate 182. A support plate 190 extends between the rear end of the fairing support plate 186 and the rear end of the side plate 182.

Mounting of the cross members 150, 152 and the fairing mounting plate 180 is effected by first positioning the lower cross member 150 on the frame down tubes 156, as shown in FIGS. 8 and 9. The locating tab 164 abuts a transverse brace 192 extending between the down tubes 156, and the mounting flanges 154 are positioned so as to center each down tube 156 between the mounting holes 160, and the mounting flanges 154 are secured to the down tubes 156 by U-bolts 162. All motorcycles with twin down tubes have a transverse brace such as the brace 192. The upper cross member 152 is then slidably secured to the down tubes 156 at a point above the lower cross member 150 by positioning the support plate 166 and the backing plate 175 about the down tubes 156 such that the mounting holes 172, 176 lie between the down tubes 156. Mounting bolts (not shown) adjustably secure the plates 166, 174 to the down tubes 156.

Each fairing mounting bracket 180 is then secured to the cross member 150, 152, as by bolts 200. Washers 202 are disposed between the cross members 150, 152 and the side plates 182. The upper cross member 152 is adjusted to align its mounting holes with the upper mounting holes 184 of each side plate 182. The upper cross member 152 is then tightly secured to the down tubes 156 by tightening the mounting bolts extending through the plates 166 and 174.

A pair of cross members is chosen for a particular motorcycle frame and for each fairing. The length of the support plate 186 and the angle between the side plate 182 and the support plate 186 are chosen to correctly position the fairing support bracket 180 relative to the motorcycle frame. The upper cross member 152 is positioned by reference to the position of the forward mounting hole 184 when the mounting bracket 180 is mounted on the lower cross member 150.

FIGS. 7-9 show a crash bar, generally designated 204, on the motorcycle frame and the fairing mounting bracket 180. Each crash bar 204 has a support rod 206 with an L-shaped crash bar 210 extending at right angles therefrom. Foot pegs 212 are axially aligned with the support rods 206 and are secured thereto as at an axial mounting hole 214 in each support rod 206. The support rods 206 and the crash bars 204 each have a mounting tongue 216, 218, respectively, with a respective mounting hole 220, 222 alignable with the lower mounting hole 184 of the side plate 182, in place of the washer 202, and with a mounting hole 223 in a mounting nut 224 on each down tube 156.

I claim:

1. In combination with a motorcycle having a frame mounted fairing, said frame having a fork head with an axis on which the front wheel fork turns, the improvement comprising:
    a disc carrier mounted on said frame in a plane at right angles to and intersecting said fork head axis; and
    a disc rotatable with respect to said carrier and connected with the motorcycle fork to turn therewith, said disc extending transversely of the front wheel fork, below the fork head and above the front wheel, to block the flow of air and water upwardly along said fork.

2. The motorcycle of claim 1 in which said disc carrier includes a plate that mates with the fairing and the motorcycle frame.

3. The motorcycle of claim 2 in which said disc carrier plate has an opening about said front wheel fork, said disc closing said opening.

4. The motorcycle of claim 3 in which said disc has a circular edge and said plate has a mating channel in which the disc edge is rotatably received.

5. The motorcycle of claim 3 in which said disc has a pleated portion connected with said plate.

6. The motorcycle of claim 4 in which said disc is generally semicircular and has pleated portions at each end thereof, connected with said plate.

* * * * *